(12) United States Patent
Wang et al.

(10) Patent No.: US 11,900,138 B2
(45) Date of Patent: Feb. 13, 2024

(54) REMOTE ACCESS CONTROL OF VM CONSOLE LOCATED IN CLOUD FROM ON-PREMISES COMPUTER DEVICE

(71) Applicant: VMware, Inc., Palo Alto, CA (US)

(72) Inventors: Fangchi Wang, Beijing (CN); Duo Zhang, Beijing (CN); Chuanwei Guo, Beijing (CN); Lijie Gao, Beijing (CN); Kevin Scott Christopher, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 697 days.

(21) Appl. No.: 16/746,202

(22) Filed: Jan. 17, 2020

(65) Prior Publication Data
US 2021/0224092 A1 Jul. 22, 2021

(51) Int. Cl.
*G06F 9/451* (2018.01)
*G06F 9/455* (2018.01)
*G06F 16/955* (2019.01)
*H04L 9/40* (2022.01)

(52) U.S. Cl.
CPC .......... *G06F 9/45558* (2013.01); *G06F 9/452* (2018.02); *G06F 16/955* (2019.01); *H04L 63/0281* (2013.01); *G06F 2009/45562* (2013.01); *G06F 2009/45595* (2013.01)

(58) Field of Classification Search
CPC .... G06F 9/45558; G06F 9/452; G06F 16/955; G06F 2009/45562; G06F 2009/45595; H04L 63/0281
See application file for complete search history.

(56) References Cited

U.S. PATENT DOCUMENTS

| | | | | |
|---|---|---|---|---|
| 9,225,661 | B1* | 12/2015 | Yang | H04L 47/70 |
| 10,645,172 | B1* | 5/2020 | Hussain | H04L 67/141 |
| 2005/0273781 | A1* | 12/2005 | Nakamura | H04L 67/51 717/173 |
| 2006/0074618 | A1* | 4/2006 | Miller | G06F 11/3664 703/13 |
| 2008/0031141 | A1* | 2/2008 | Lean | H04L 49/3081 370/241 |
| 2012/0096271 | A1* | 4/2012 | Ramarathinam | H04L 63/168 709/227 |
| 2016/0285832 | A1* | 9/2016 | Petrov | H04L 67/60 |
| 2018/0124051 | A1* | 5/2018 | Wang | H04L 67/08 |
| 2020/0280846 | A1* | 9/2020 | Frederick | H04L 63/0884 |

* cited by examiner

*Primary Examiner* — Emerson C Puente
*Assistant Examiner* — Jonathan R Labud
(74) *Attorney, Agent, or Firm* — Kim & Stewart LLP

(57) ABSTRACT

A method of enabling remote access to a console of a virtual machine (VM) running in a host and managed by a VM management server, from a remote computing device, includes the steps of: in response to a request to access the console of the VM from the remote computing device, issuing a request for a first ticket, the first ticket including an identifier of the host in which the VM is running; upon receiving the first ticket, issuing a request for a second ticket to access a proxy server; and upon receiving the second ticket, transmitting a uniform resource locator (URL) identifying the proxy server and the second ticket to the remote computing device. The remote computing device accesses the console of the VM through the URL and the proxy server.

17 Claims, 4 Drawing Sheets

REMOTE ACCESS CONTROL OF VM CONSOLE LOCATED IN CLOUD FROM ON-PREMISES COMPUTER DEVICE

BACKGROUND

A cloud computing platform offering cloud services employs virtualization software to provision virtual compute, storage, and networking resources from physical hardware resources and partitions the virtual compute, storage and network resources for different customers. The provisioned virtual compute resources include virtual machines (VMs), and IT administrators of the different customers often access the VM console remotely from a web client to perform tasks in the VM, such as installing an operating system, configuring the operating system settings, running applications, monitoring performance, and so on. In certain types of deployments, providing remote VM console access for VMs running in a cloud computing environment require virtual private network (VPN) setup, which can be tedious and error-prone.

SUMMARY

One or more embodiments provide a method of providing remote console access to a virtual machine (VM) running in a cloud computing environment.

A method of enabling remote access to a console of a virtual machine (VM) running in a host and managed by a VM management server, from a remote computing device, includes the steps of: in response to a request to access the console of the VM from the remote computing device, issuing a request for a first ticket, the first ticket including an identifier of the host in which the VM is running; upon receiving the first ticket, issuing a request for a second ticket to access a proxy server; and upon receiving the second ticket, transmitting a uniform resource locator (URL) identifying the proxy server and the second ticket to the remote computing device. The remote computing device accesses the console of the VM through the URL and the proxy server.

Further embodiments include a non-transitory computer-readable storage medium comprising instructions that cause a computer system to carry out the above method above, as well as a computer system configured to carry out the above method.

DETAILED DESCRIPTION

Figure 1:
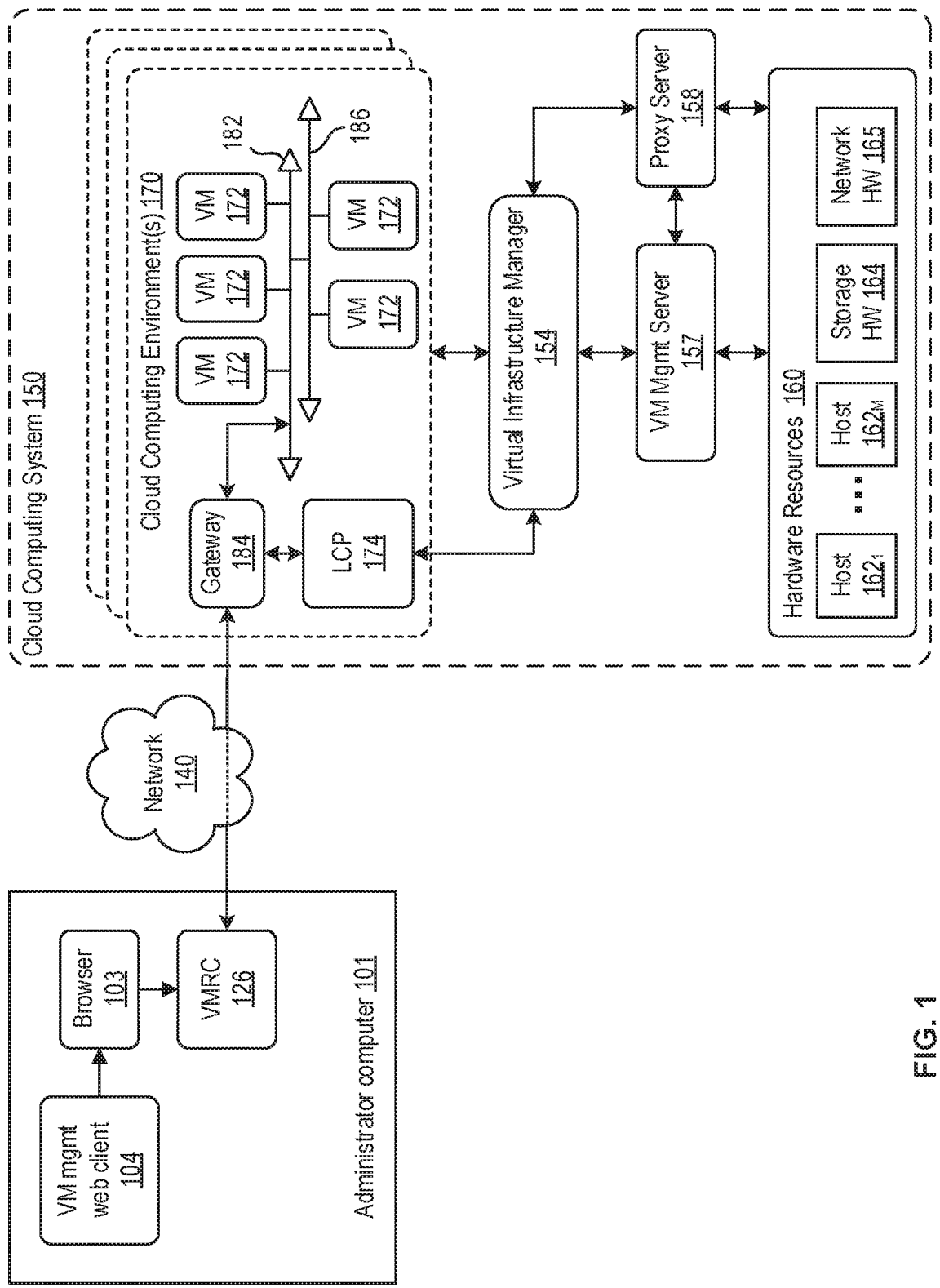
FIG. 1 is a block diagram of a computing system in which one or more embodiments may be utilized.

FIG. 1 is a block diagram of a computing system in which one or more embodiments may be utilized. As shown, an IT administrator for a particular customer of cloud computing system 150 is accessing cloud computing environment 170 that has been provisioned for that customer, from administrator computer 101. Administrator computer 101 includes VM management web client 104 through which IT administrator issues commands to VM management server 157 to manage VMs 172 and other virtual resources that have been provisioned in cloud computing environment 170. According to embodiments, VM management web client 104 also enables IT administrator to remotely access VM consoles of VMs 172 through a VM remote console (VMRC) 126.

Cloud computing system 150 includes the following control plane components, a virtual infrastructure manager 154 and a VM management server 157, through which virtual compute, storage and network resources are provisioned for different customers of cloud computing system. VM management server 157 is a virtualization management software executed in a physical or virtual server (e.g., VMware vCenter Server®), that cooperates with hypervisors installed in hosts $162_1$ to $162_M$ to provision virtual compute, storage and network resources from hardware resources 160, which include hosts $162_1$ to $162_M$, storage hardware 164, and network hardware 165. Virtual infrastructure manager 154 is a virtualized infrastructure management software executed in a physical or virtual server (e.g., VMware vCloud Director®), that partitions the virtual compute, storage and network resources provisioned by VM management server 157, for the different customers of cloud computing system 150. As shown in FIG. 1, cloud computing system 150 may support multiple cloud computing environments 170, available to different customers in a multi-tenant configuration.

The virtual compute, storage, and network resources are provisioned in cloud computing environment 170 to form a virtual data center or a software-defined data center. The virtual data center includes one or more virtual networks 182 used to communicate amongst VMs 172 and managed by at least one network gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to an external network 140 (e.g., Internet). Gateway 184 manages external public IP addresses for the virtual data center and one or more private internal networks interconnecting VMs 172. Gateway 184 is configured to route traffic incoming to and outgoing from the virtual data center and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway (not shown) within an on-premises (private) network or another cloud computing system.

The virtual data center further includes a local control plane (LCP) 174, implemented as a physical or virtual server, configured to communicate with virtual infrastructure manager 154 and enable control-plane communications between administrator computer 101 and virtual infrastructure manager 154.

Cloud computing system 150 further includes a proxy server 158, which enables a network connection to be established between VMRC 126 and VM 172 so that remote access to a console of VM 172 is possible. Details of how such a network connection is established are described below, with reference to FIGS. 2, 3 and 4.

Figure 2:
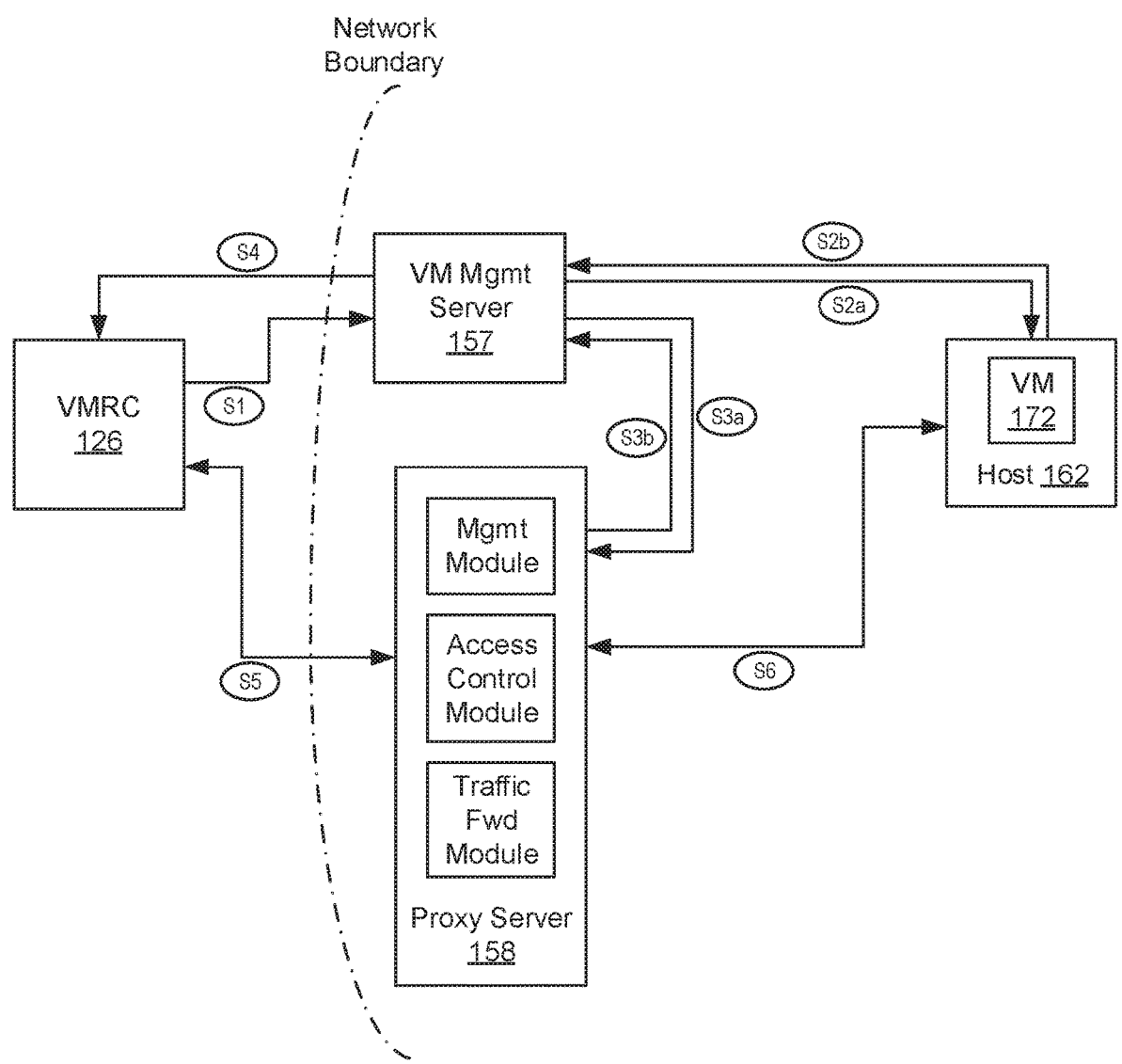
FIG. 2 is a block diagram and signal flow diagram showing the steps of enabling remote access to a console of a VM running in a cloud computing environment, according to one or more embodiments.

FIG. 2 is a block diagram and signal flow diagram showing the steps of enabling remote access to a console of a target VM running in a cloud computing environment, according to one or more embodiments. When the IT administrator clicks on a hyperlink in VM management web client 104 for opening a console of the target VM remotely, browser 103 is asked to open a URL (uniform resource locator), whose scheme looks like "vmrc://<ticket>@<vc_hostname>?moid=<vm_id>" where <ticket> is a ticket that is issued to those users who have administrator rights to call APIs exposed by virtual infrastructure manager 154, <vc_hostname> is the name of the host in which the target VM is running, and <vm_id> is the ID of the target VM. VMRC 126 is previously registered as the default handler for this type of URL, and is thus invoked by browser 103 when the IT administrator clicks on the hyperlink. When VMRC 126 is invoked in this manner, the URL is passed as an argument by browser 103 to VMRC 126. VMRC 126 then performs several steps, which are described in further detail below, before presenting the VM console to the IT administrator.

VMRC 126 first establishes a virtual infrastructure management (VIM) session with VM management server 157 by transmitting the <ticket> to VM management server 157 (through gateway 184, LCP 174, and virtual infrastructure manager 154). After having established the VIM session, VMRC 126 at step S1 calls an API (which is one of APIs exposed by VM management server 157 for controlling virtual resources that it provisioned) to retrieve from host 162 a new ticket for accessing the mouse, keyboard, and screen (MKS) of the target VM. The new ticket include an identifier of host 162, e.g., hostname or full-qualified domain name (FQDN), that the target VM is running in and a WebSocket URL, a first end of which is an interface to which VMRC 126 connects and a second end of which is a public interface of proxy server 158. In FIG. 2, the execution of the API call by VM management server 157 is depicted as step S2a and the return of the values of the called API is depicted as step S2b.

After step S2b, VM management server 157, in step S3a, submits a request to proxy server 158 for another ticket (referred to herein as a "proxy ticket"). The request includes the Web Socket MKS ticket that was returned by host 162 to VM management server 157 in step S2b. In response to the request in step S3a, management module of proxy server 158, in step S3b, creates the proxy ticket, maps the proxy ticket to the Web Socket MKS ticket (which includes the host identifier), e.g., by storing the proxy ticket and the Web Socket MKS ticket in association with each other, and sends the proxy ticket to VM management server 157.

Thereafter, VM management server 157, in step S4, sends via a standard network connection, such as an 'HTTP' or 'HTTPS' connection, the proxy ticket and the Web Socket URL to VMRC 126. The public IP address of proxy server 158, which was provided to VM management server 157 when proxy server 158 initially registered in cloud computing system 150, is embedded within the Web Socket URL.

In step S5, VMRC 126 establishes a Web Socket connection using the Web Socket URL. Because the Web Socket URL has embedded therein the public IP address of proxy server 158, VMRC 126 is able to communicate with proxy serer 158 through this Web Socket connection. In the embodiments, the Web Socket connection is employed for communication between VMRC 126 and proxy server 158 because the communication is full-duplex (i.e., data can be transmitted in both directions at the same time). In addition, both unencrypted and encrypted communications are possible using the Web Socket connection. Unencrypted communications employ the prefix 'ws://' and encrypted communications employ the prefix 'wss://.' Through the WebSocket connection, VMRC 126 transmits the proxy ticket to proxy server 158 to authenticate itself. An access control module of proxy server 158 validates the proxy ticket and locates host 162 using the mapping that was stored when management module of proxy server 158 created the proxy ticket in step S3b.

After VMRC 126 is authenticated, proxy server 158 establishes an MKS channel for carrying MKS traffic between proxy server 158 and host 162, as depicted in FIG. 2 as step S6. Thereafter, traffic forwarding module of proxy server 158 forwards MKS traffic received from VMRC 126 through the WebSocket connection to host 162 and MKS traffic received from host 162 to VMRC 126 through the Web Socket connection.

The embodiments also enable a remote device, e.g., a local USB device, to be redirected from administrator computer 101 to VM 172. To achieve this, VMRC 126 calls another API via the VIM session, asking for a new ticket for the remote device. In return, VMRC 126 obtains a new WebSocket URL for establishing a new WebSocket connection to communicate with proxy server 158, and the remote device traffic is transmitted over the new WebSocket connection between VMRC 126 and proxy server 158 and between proxy server 158 and host 162.

The use of a Web Socket connection and the use of a proxy server according to one or more embodiments require only minor changes to existing network connections, the one noticeable difference being that traffic is sent over a TCP connection via a Web Socket connection instead of an HTTP connection. Therefore, embodiments offer a simple solution for enabling remote VM console access in a cloud computing environment without introducing any extra security risks. The solution is also scalable to support dynamic and increased traffic bandwidth requirements on an as-needed basis, and allows for fine-grained control logic to be utilized (by leveraging proxy server 158) as circumstances may warrant over time.

In addition, proxy server 158 operates as a "reverse" proxy (i.e., a type of proxy server that retrieves resources on behalf of a client from one or more servers and then returned to the client, appearing as if they originated from the proxy server itself), so that host 162 is transparent to VMRC 126). By using reverse proxy and ticket validation, security risks with general HTTP proxies are avoided. First, the proxy is transparent to the client side in that VMRC 126 thinks it is still communicating with host 162. Second, the ticket validation is required to prevent any unauthorized access. Furthermore, as an independent service, the proxy is stateless and therefore it makes it easier to scale—multiple instances and load-balancers could be deployed to cope with increasing bandwidth demands when necessary. MKS traffic involves picture frames that could consume significant amount of bandwidth resource, so being able to easily scale is a key aspect to guarantee smooth console experience.

Also, the three separate modules of proxy server 158 as depicted in FIG. 2 bring flexibility with capability for customization to suit a customer's specific requirements, such as having the management module of proxy server 158 be responsible for communicating with VM management server 157 or another cloud management service to provide extra operational information and capabilities such as performance metrics, list of current Web Socket sessions, and capability to control each Web Socket session. Further, a more complicated policy may be applied by access control module of proxy server 158 to further enhance the security, if needed, such as by requiring encrypted data to/from VMRC 126 and host 162, and/or by requiring an additional authentication information from administrator computer 101 (such as requesting biometric data from administrator computer 101, to be compared against a database of biometric data associated with administrator computer 101, as stored in a memory accessible by proxy server 158). Still further, traffic forwarding module of proxy server 158 may be assigned to record the traffic or the VM console session (e.g., the amount of time in which the VM console session was running, and/or the amount of traffic sent via the Web Socket connection during the VM console session) for future auditing purposes.

Figure 3:
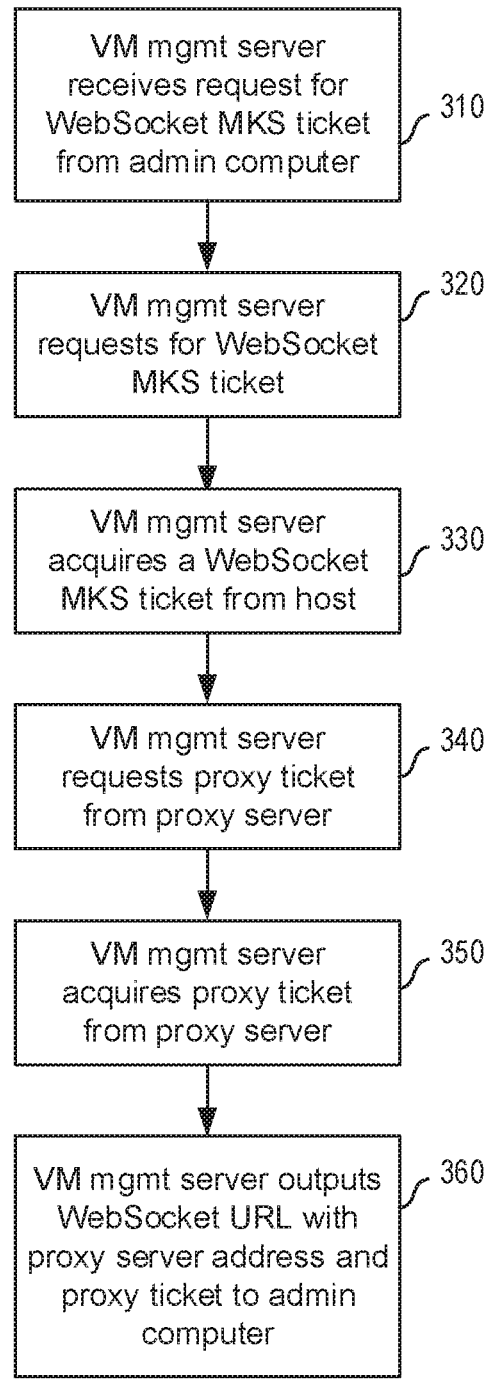
FIG. 3 is a flow diagram showing steps performed by a VM management server, according to one or more embodiments, to enable remote access to the console of a VM running in a cloud computing environment.

FIG. 3 is a flow diagram showing steps performed by a VM management server, according to one or more embodiments, to enable remote console access to a VM running in a cloud computing environment.

The method of FIG. 3 begins at step 310, where VM management server 157 receives an API call to request a Web Socket MKS ticket from administrator computer 101. In response, VM management server 157 at step 320 requests the Web Socket MKS ticket from host 162 in which the target VM is running, and at step 330 acquires the Web Socket MKS ticket from host 162. Then, at step 340, VM management server 157 sends a request for a proxy ticket to proxy server 158. The proxy ticket request includes the Web Socket MKS ticket. At step 350, VM management server 157 acquires the proxy ticket from proxy server 158. Thereafter, at step 360, VM management server 157 sends via a standard network connection, such as an 'HTTP' or 'HTTPS' connection, the proxy ticket and the WebSocket URL to VMRC 126. The public IP address of proxy server 158, which was provided to VM management server 157 when proxy server 158 initially registered in cloud computing system 150, is embedded within the Web Socket URL.

Figure 4:
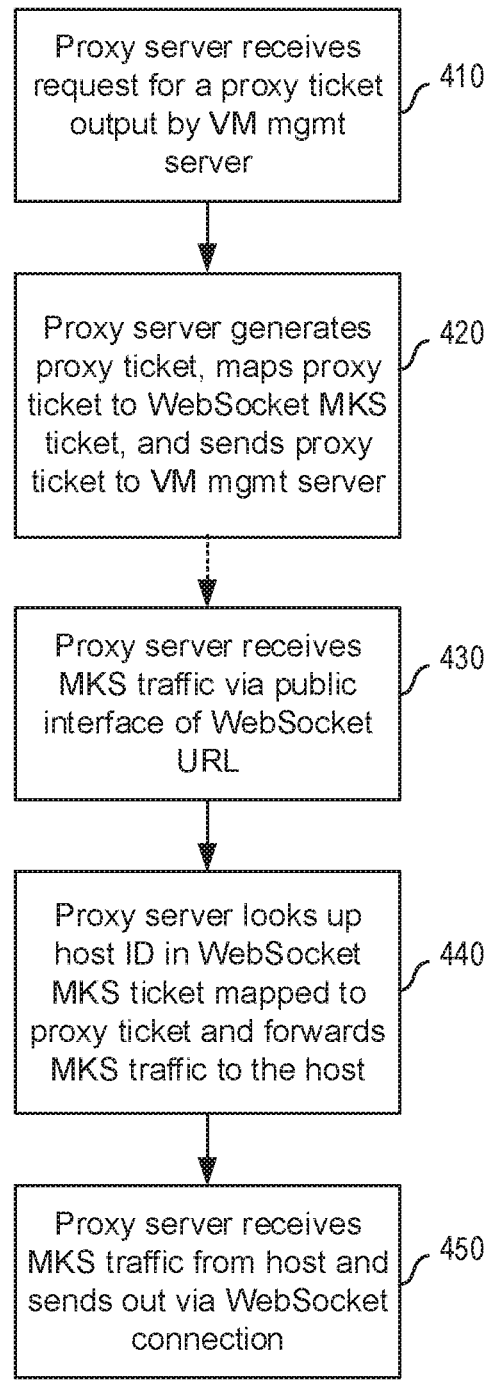
FIG. 4 is a flow diagram showing steps performed by a proxy server, according to one or more embodiments, to enable remote access to the console of a VM running in a cloud computing environment.

FIG. 4 is a flow diagram showing steps performed by a proxy server, according to one or more embodiments, to enable remote console access to a VM running in a cloud computing environment. Steps 410 and 420 represent steps carried out by proxy server 158 to process a request from VM management server 157. Steps 430, 440, and 450 represent steps carried out by proxy server 158 to process a request from administrator computer 101. Therefore, step 430 is not programmatically synchronous with step 420 and the arrow connection between step 420 and step 430 is depicted as a dotted arrow.

At step 410, proxy server 158 receives a request for a proxy ticket from VM management server 157. In response, proxy server 158 at step 420 generates a proxy ticket based on the WebSocket MKS ticket, maps the proxy ticket to the WebSocket MKS ticket (which includes the host identifier), e.g., by storing the proxy ticket and the WebSocket MKS ticket in association with each other, and sends the proxy ticket to VM management server 157.

At step 430, proxy server 158 receives MKS traffic via the public interface of the Web Socket URL along with a proxy ticket. In step 440, proxy server 158 looks up the host ID in the Web Socket MKS ticket that is mapped to the received proxy ticket, and forwards the received MKS traffic to host 162 (that has the host ID). Then, at step 450, proxy server 158, upon receiving MKS traffic from host 162, transmits the received MKS traffic from host 162 to administrator computer 101 via the public interface of the Web Socket URL. Once the transmission tunnel from VMRC 126 and host 162 has been established via use of proxy server 158, the traffic between VMRC 126 and host 162 becomes opaque with respect to proxy server 158, in that proxy server 158 blindly passes traffic from VMRC 126 to host 162 and from host 162 to VMRC 126 at step 450, without requiring a host ID lookup that was performed earlier at step 440.

It should be understood that steps 430, 440, and 450 are executed so long as there is MKS traffic between VMRC 126 and VM 172. It should also be recognized that MKS traffic in the embodiments contain commands entered by IT administrator to open the VM console in VM 172, and using the opened VM console, to perform various tasks in the VM, such as installing or patching an operating system, configuring the operating system settings, running applications, monitoring performance, and so on.

As described above, embodiments provide VMRC 126 with remote VM console access to VMs running in hosts that are in a network within a cloud computing environment using readable hostnames or FQDNs. As such, even though VMRC 126 cannot access the hosts directly via a public IP address, remote VM console access to VMs is made possible. By contrast, in the related art, users would have had to establish a VPN connection, the setup procedures for which are tedious and error-prone as noted above, to enable remote VM console access to VMs running in the cloud computing environment.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of enabling remote access to a console of a virtual machine (VM) running in a host and managed by a VM management server, from a remote computing device, the method comprising:
   in response to a request to access the console of the VM from the remote computing device, issuing a request for a first ticket to the host, the first ticket including an identifier of the host in which the VM is running;
   upon receiving the first ticket from the host, issuing a request for a second ticket to access a proxy server to the proxy server, wherein the request for the second ticket includes the first ticket; and
   upon receiving the second ticket from the proxy server, transmitting a uniform resource locator (URL) identifying the proxy server and the second ticket to the remote computing device,
   wherein the remote computing device accesses the console of the VM through the URL and the proxy server, and the proxy server identifies the host of the VM using the first ticket associated with the second ticket.

2. The method of claim 1, wherein the URL includes a public IP address of the proxy server.

3. The method of claim 2, wherein the URL is a WebSocket URL having a first end to which a WebSocket connection is established with the remote computing device and a second end to which a public interface of the proxy server is connected.

4. The method of claim 3, wherein the remote computing device issues commands via the Web Socket URL for opening the console of the VM and entering line commands into the console of the VM.

5. The method of claim 4, wherein the remote computing device communicates with the proxy server over a full-duplex communication channel and mouse, keyboard, and screen (MKS) traffic, which includes the commands for opening the console of the VM and entering line commands into the console of the VM, is transmitted through the full-duplex communication channel.

6. The method of claim 5, wherein the MKS traffic includes a screen of the VM that is generated in response to the commands issued by remote computing device and contained in the MKS traffic received by the proxy server.

7. A method of enabling remote access to a console of a virtual machine (VM) running in a host and managed by a VM management server, from a remote computing device, the method comprising:
   in response to a request from the VM management server to access a proxy server through which the console of the VM is accessed from the remote computing device, wherein the request includes a first ticket including an identifier of the host in which the VM is running, returning by the proxy server a second ticket that permits access to the proxy server, to the VM management server;
   mapping by the proxy server the first ticket to the second ticket; and
   upon verifying by the proxy server that a third ticket transmitted by the remote computing device matches the second ticket, identifying by the proxy server the host using the first ticket that is mapped to the second ticket, forwarding by the proxy server mouse, keyboard, and screen (MKS) traffic from the remote computing device to the host and forwarding by the proxy server MKS traffic from the host to the remote computing device.

8. The method of claim 7, wherein said mapping includes storing the first ticket in association with the second ticket.

9. The method of claim 8, further comprising:
   upon verifying that the second ticket matches the third ticket, extracting the identifier of the host from the first ticket that is stored in association with the second ticket.

10. The method of claim 7, wherein the first ticket includes a WebSocket URL, which has a first end to which a WebSocket connection is established with the remote computing device and a second end to which a public interface of the proxy server is connected.

11. The method of claim 10, wherein the proxy server receives the MKS traffic from the remote computing device through the Web Socket connection and the public interface of the proxy server.

12. The method of claim 11, wherein the Web Socket connection is a full-duplex communication channel.

13. The method of claim 12, wherein the MKS traffic includes a screen of the VM that is generated in response to the commands issued by remote computing device and contained in the MKS traffic received by the proxy server.

14. A computer system comprising:
   a memory configured to store executable code for remotely accessing a console of a virtual machine (VM) running in a host; and a processor configured to execute the code to:
  issue a request to a VM management server to access mouse, keyboard, and screen (MKS) of the VM;
  upon receiving a ticket in response to the request, establish a full-duplex communication channel using a URL specified in the ticket;
  transmit the ticket through the full-duplex communication channel for authentication; and
  upon being authenticated, issue commands through the full-duplex communication channel and generate a display screen based on mouse, keyboard, and screen (MKS) traffic returned in response to the commands, wherein
the commands issued include commands for opening the console of the VM and entering line commands into the console of the VM, and
the line commands entered into the console of the VM are commands for executing tasks in the VM, the tasks including installing an operating system, configuring the operating system settings, running applications, and monitoring performance.

15. The computer system of claim 14, wherein the URL includes a public IP address of a proxy server that communicates with the host in which the VM is running.

16. The computer system of claim 15, wherein the full-duplex communication channel is a Web Socket connection and the URL is a Web Socket URL having a first end to which the WebSocket connection is established and a second end to which a public interface of the proxy server is connected.

17. The computer system of claim 14, wherein the VM is provisioned in a cloud computing system.

* * * * *